June 23, 1925. 1,543,022
H. C. MILLER
THREAD TRIMMING MECHANISM FOR BUTTONHOLE MACHINES
Original Filed June 26, 1914 7 Sheets-Sheet 1

Inventor
H. C. Miller.

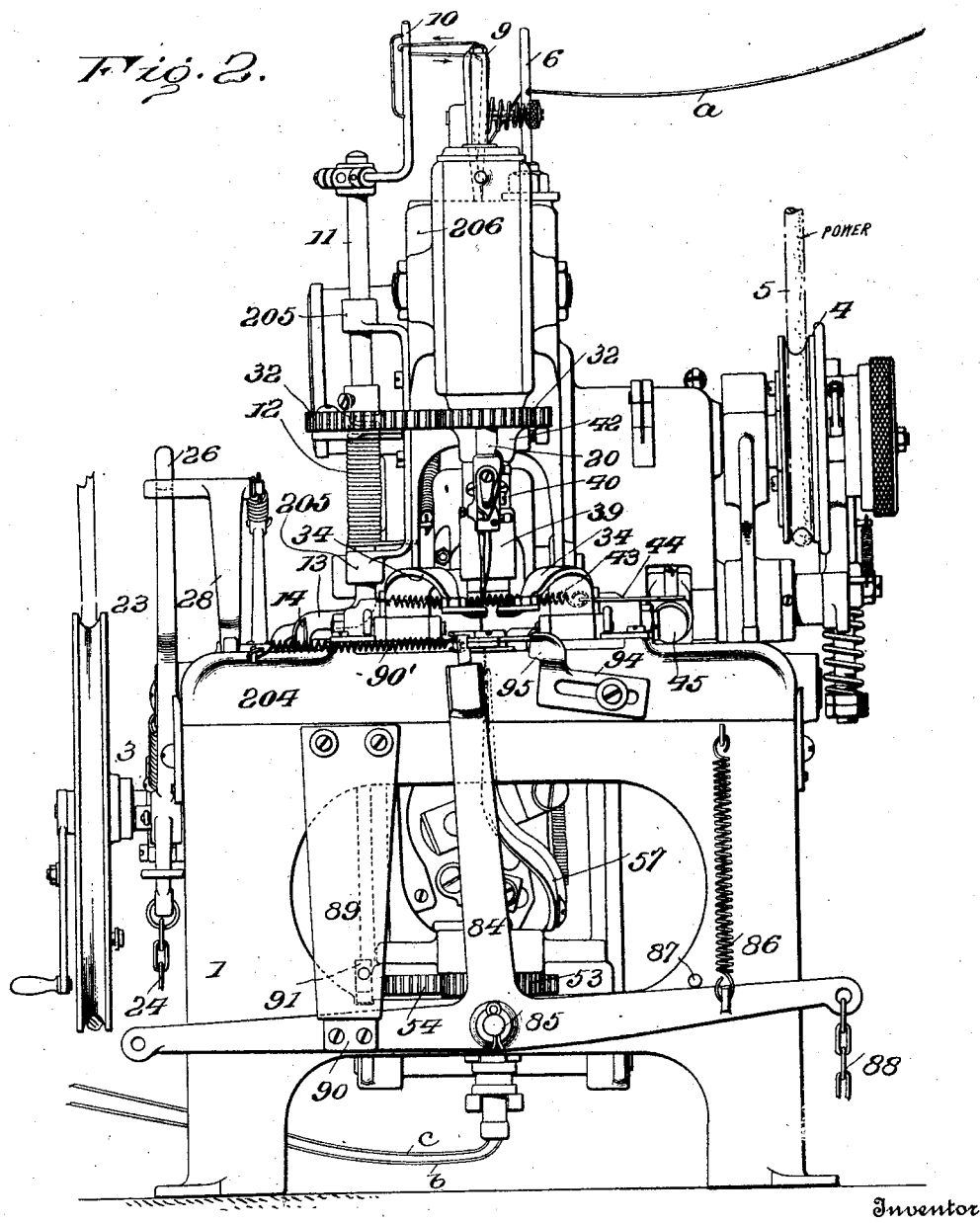

June 23, 1925.
H. C. MILLER
1,543,022
THREAD TRIMMING MECHANISM FOR BUTTONHOLE MACHINES
Original Filed June 26, 1914    7 Sheets-Sheet 3
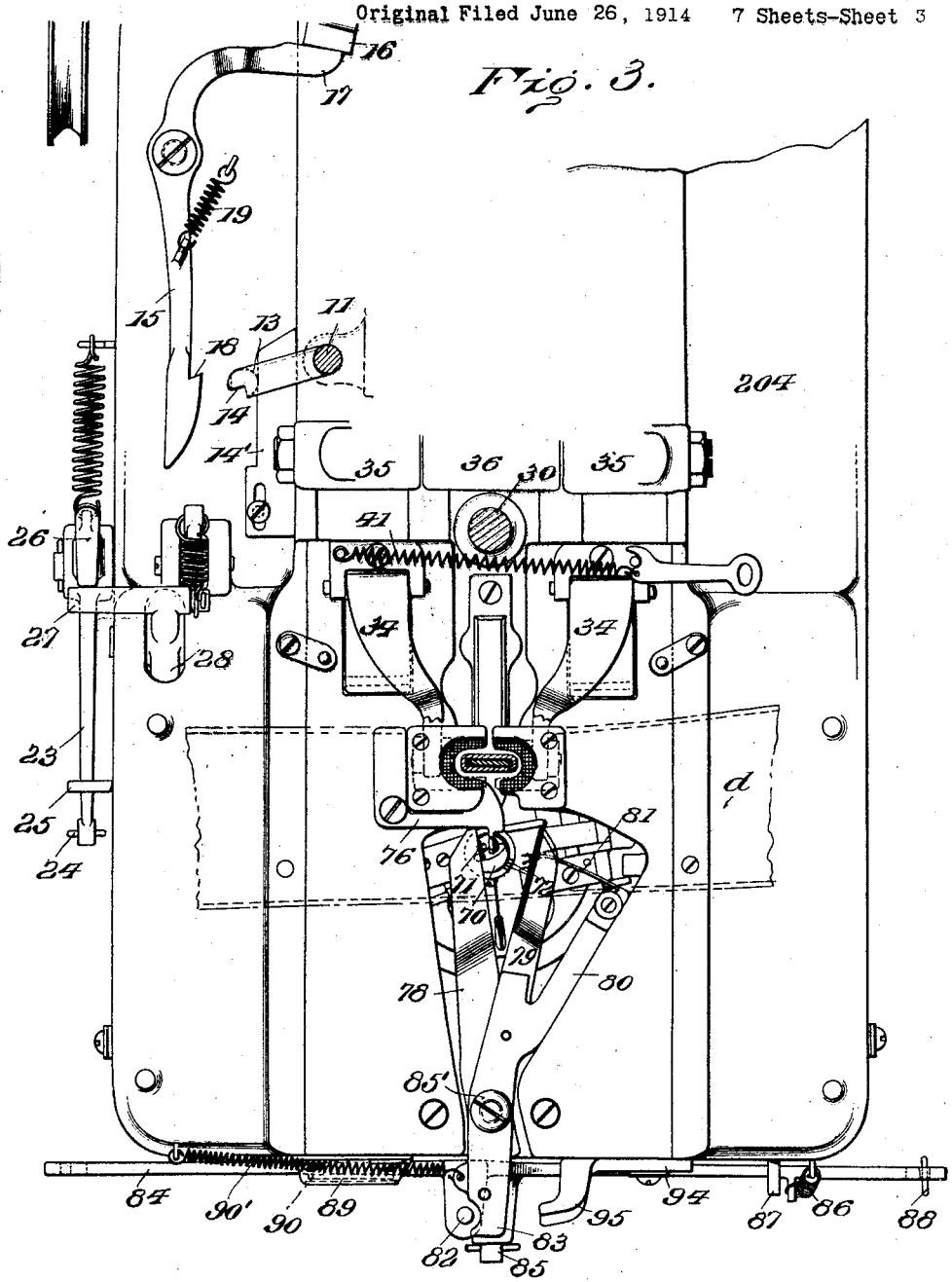

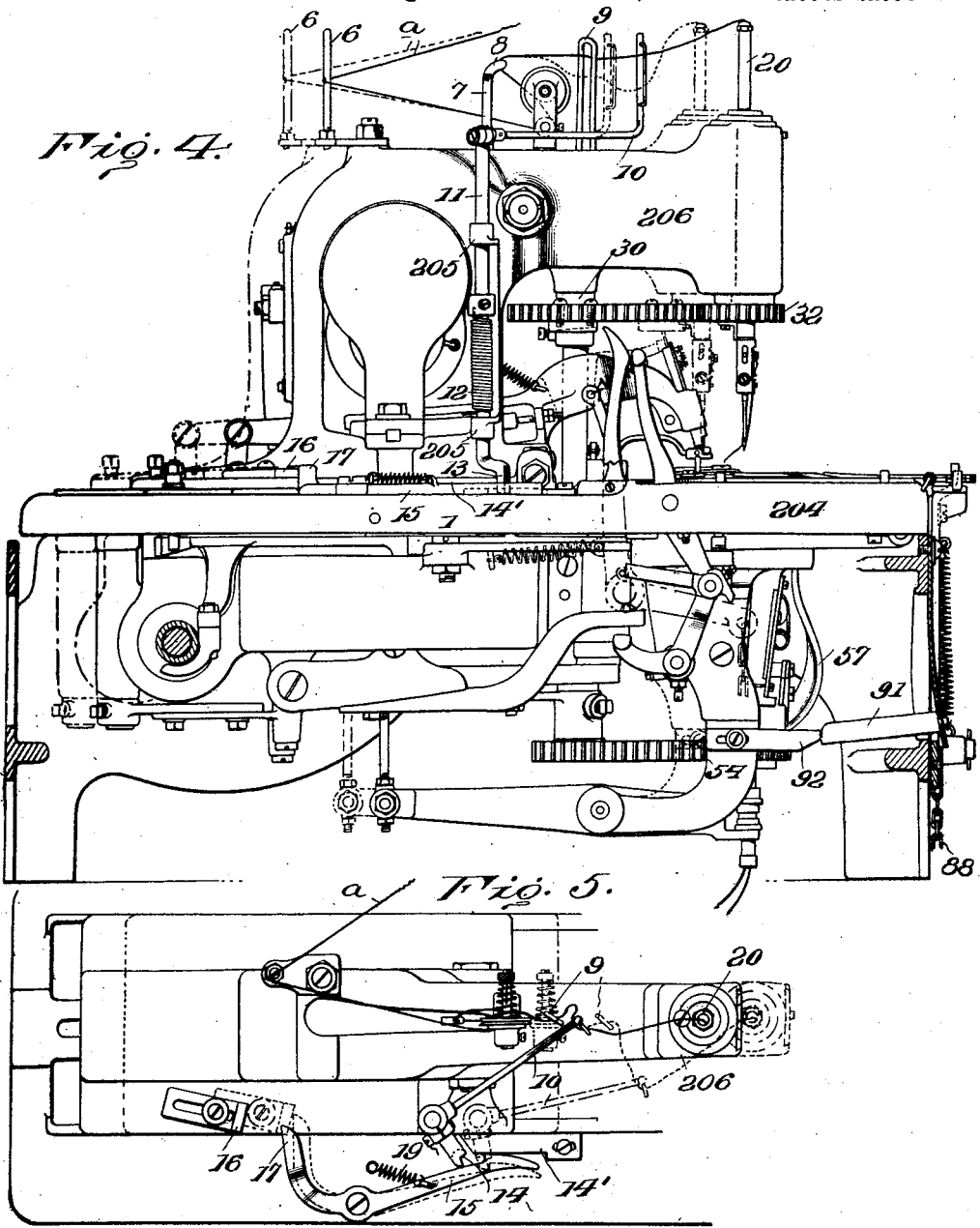

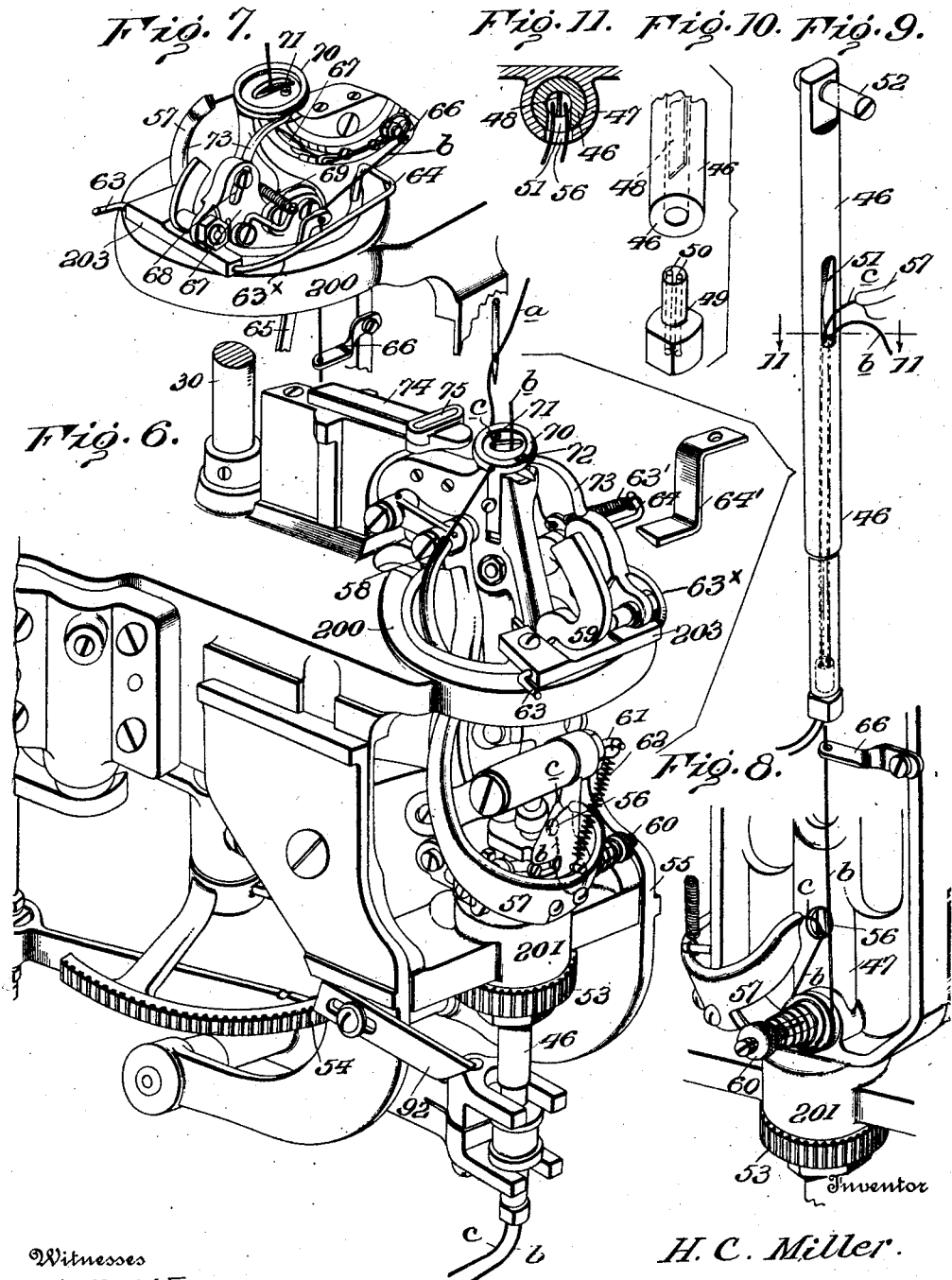

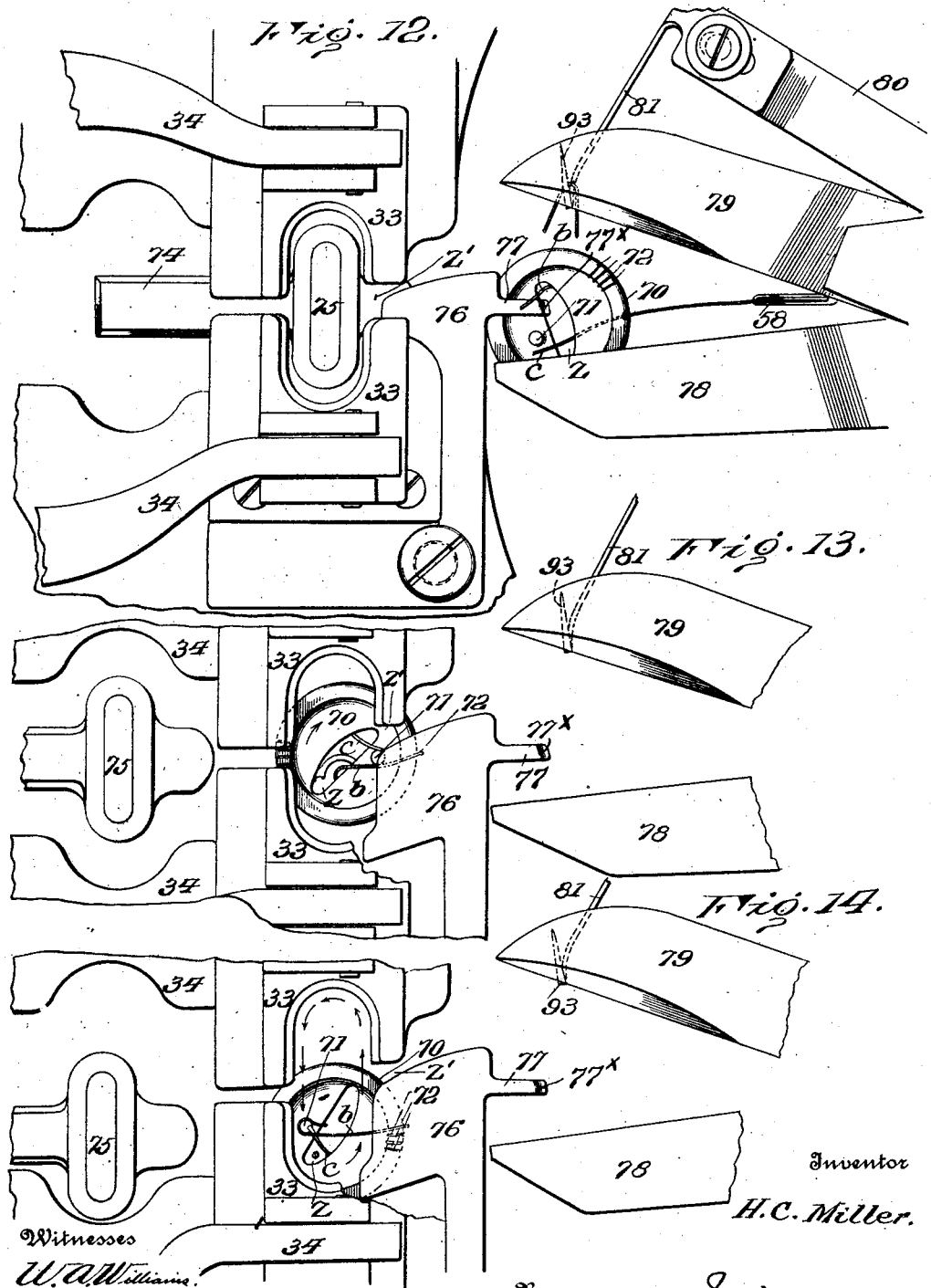

June 23, 1925.
H. C. MILLER
1,543,022
THREAD TRIMMING MECHANISM FOR BUTTONHOLE MACHINES
Original Filed June 26, 1914   7 Sheets-Sheet 7
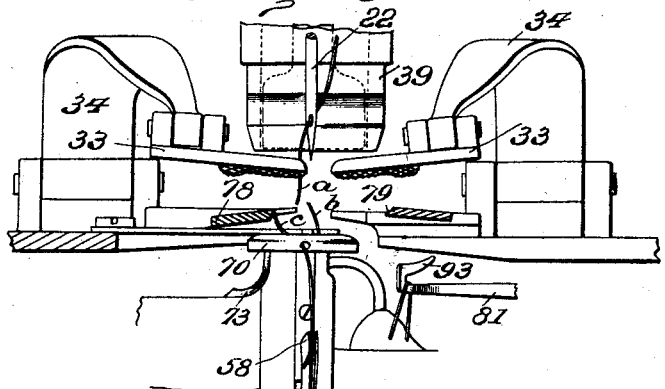
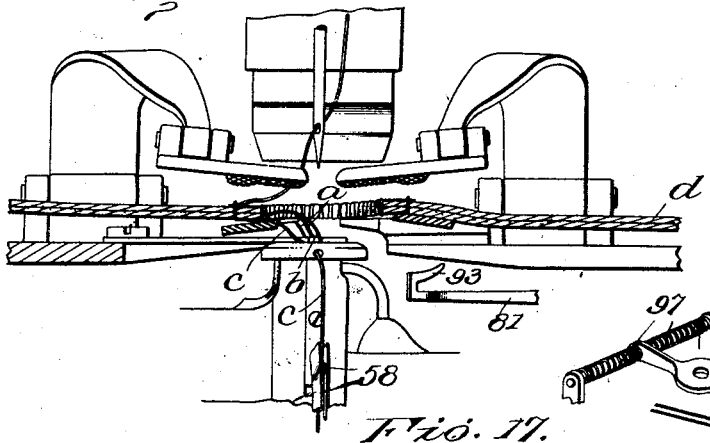
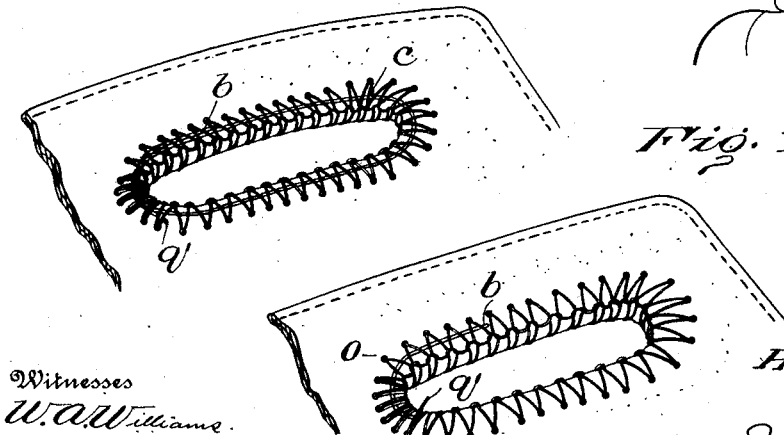

Patented June 23, 1925.

1,543,022

UNITED STATES PATENT OFFICE.

HENRY C. MILLER, OF WATERFORD, NEW YORK.

THREAD-TRIMMING MECHANISM FOR BUTTONHOLE MACHINES.

Application filed June 26, 1914, Serial No. 847,534. Renewed April 1, 1920. Serial No. 370,536.

*To all whom it may concern:*

Be it known that I, HENRY C. MILLER, citizen of the United States, residing at Waterford, in the county of Saratoga and State of New York, have invented certain new and useful Improvements in Thread-Trimming Mechanism for Buttonhole Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is directed primarily to a thread trimming mechanism adapted more particularly for a traveling arm buttonhole machine, but not essentially limited thereto.

In this type of machine the parts which carry the sewing mechanism, and the parts which operate the same in the act of making a buttonhole, move, as distinguished from the movement of the clamping mechanism and cloth, as in other buttonhole machines. In this type of machine difficulties have been experienced in providing a satisfactory thread trimming attachment, and it is the purpose and object of this invention to provide mechanism for practically and successfully trimming the thread. To illustrate the application of the invention I have shown and will describe the same in connection with what is known in the art as a Reece buttonhole machine, such as indicated generally in Patent No. 462,865, dated Nov. 10, 1891.

In the drawings:

Fig. 2 is a front elevation of the same.

Fig. 3 is a top plan view of a portion of a sewing machine, illustrating the thread trimmer and its relation to the cloth clamp, and also illustrating part of the needle thread tripping mechanism for producing slack thread.

Fig. 4 is a side elevation of a Reece machine illustrating the trimmer lock in inoperative position.

Fig. 5 is a detail plan view illustrating the needle thread slacking device in inoperative position in full lines and in operative position in dotted lines.

Fig. 6 is a detail perspective view of the lower stitch forming mechanism, with my lower cord leading tube and the lower thread slacker.

Fig. 7 is a detail perspective view of the thread slacker.

Fig. 8 is a detail perspective view of the outlet for the cord and the lower thread from the opening of the lower needle and looper actuator bar.

Fig. 9 is a perspective view showing the hollow needle and hook actuating bar formed to permit the passage therethru of the cord and lower needle threads.

Fig. 10 is a detail perspective view of the lower part of the stitch actuator bar, showing the thread lead nipple separated from said bar, which causes the cord and the lower needle thread to be held separate, and also shows the dividing wall in said bar which retains the cord and thread entirely separate from each other therethrough until the opening thereto is reached.

Fig. 11 is a detail section on the line 11—11 of Fig. 9.

Fig. 12 is an enlarged plan view of the clamp and trimmer mechanism in normal position.

Fig. 13 is a similar view, the parts being in the position after the fabric is clamped and the stitching mechanism is moved forwardly to locate same in operative position. This figure also illustrates the needle thread being clamped against the needle thread clamping plate and the moving throat plate.

Fig. 14 is a similar view, the throat plate being in position where the stitching starts and where the throat plate reverses its motion to sew the first end in the overstitching which composes the buttonhole stitching; the corrugation on the margin of the throat plate causing the thread to be released from its clamped position.

Fig. 15 is a detail transverse section of the clamp in raised position after the fabric has been trimmed and removed, particularly illustrating the loop which has been cut by the trimmer and thereby prevented from being sewed into the next buttonhole.

Fig. 16 is a view similar to Fig. 15, but illustrating the parts in positions where the clamp has been released and the fabric in position to have the thread and cord trimmed therefrom.

Fig. 17 is a conventional perspective view of the underside of a completed corded and stitched buttonhole.

Fig. 18 is a view similar to Fig. 17, with the cord omitted and illustrating how the first held lower needle thread is sewed in under the overstitches.

Fig. 19 is a detail perspective view of the improved buttonhole punching remover.

Fig. 20 is a detail perspective view of the throat plate and the thread carrying pin and corrugations, showing also the hook and lower needle.

Figure 1:
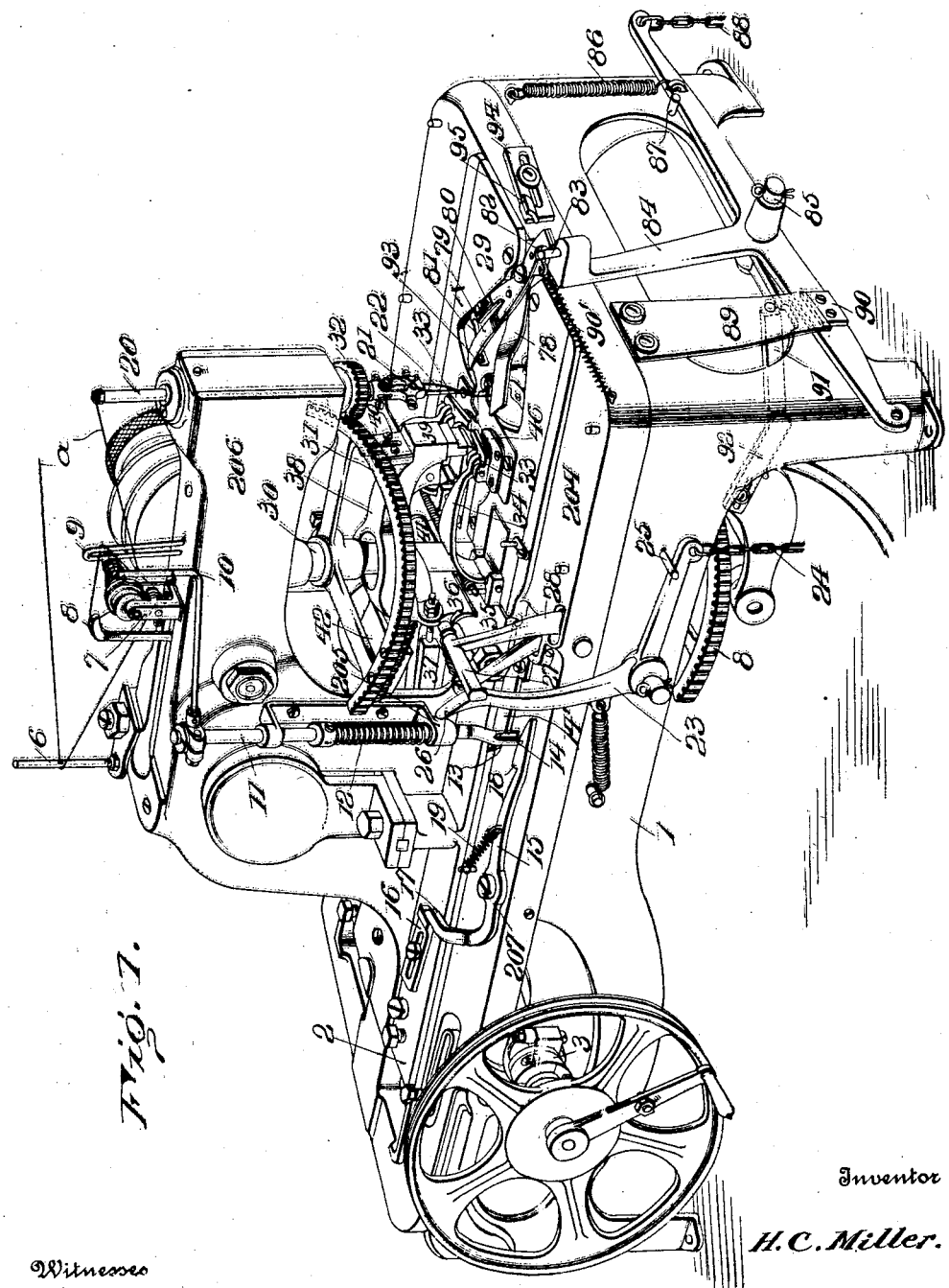
Fig. 1 is a general perspective of a Reece moving arm buttonhole machine.

The buttonhole produced by the machine to be described is known in the art as "the cut first overseam corded buttonhole" the cord at the end overlapping far enough to strengthen the finishing end, so that it is equal to the other end. In the method of stitching this class of buttonhole on the Reece machine, at the completion of the buttonhole, the needle thread leads down around the hook below the fabric and is fastened to the fabric by the prior completed stitch in the fabric, so that when the cutting or trimming of the thread occurs it not only trims the lower thread but it also cuts the upper thread by the same cutting mechanism that trims the cord and lower thread; this leaves a loop or short length which is entirely cut free and which would be sewed in if provision was not made to withdraw it by means of a loop extractor. This method of trimming also simplifies my trimming mechanism and by the addition of the upper and lower thread slacking mechanism, I do not lose the ends when starting on the next buttonhole. By changing cams, this machine will make an eyelet or any other style buttonhole, and my thread trimmer will work equally as well on either form of buttonhole.

To avoid losing the cord, which reinforces the buttonhole, I provide a tube lead or cord guide which revolves and moves with the lower needle and looping mechanism while in the act of making the buttonhole, in conjunction with the upper needle actuating mechanism. This cord guide always keeps the cord normal, and does not increase the strain of withdrawing the cord end from the position left by the trimmer at the time of severing from the prior made buttonhole, the cord being, by that operation, long enough to be caught by the next buttonholing operation. If this was not provided for, the cord would withdraw out of the reach of the sewing mechanism and therefore could not be worked in with the buttonhole stitches. The means for providing for this operation is plainly illustrated in Figs. 6, 8, 9, 10, and 11.

It is to be understood that these parts all travel back and forth and revolve with the upper needle and stitch forming mechanism while making a buttonhole; the back and forth or reciprocating movement being illustrated in full and dotted lines in Fig. 4, and the parts that revolve while forming the ends of the buttonhole are swiveled in bearings 200 and 201, shown in Figs. 6, 7, and 8. 46 indicates a hollow needle and hook-actuating bar, provided with a partition or dividing wall 48, which extends part way of the bar, and terminates at its lower end a short distance from the lower end of the bar, as best shown in Figs. 9 and 10. I take advantage of the hollow bar, and by inserting the partition form guides for a reinforcing cord $c$ and a lower needle thread $b$; thus avoiding the possibility of the lower thread and cord twisting around each other while the mechanism is operating to form a buttonhole. To further facilitate the ease of drawing of the thread and cord I employ a nipple 49, which fits in the lower end of the hollow bar 46, and in which are two guide holes 50, one being for the cord $c$ and the other for thread $b$. Both the cord $c$ and the thread $b$ have outlets from the guides through opening 51 in bar 46, and at this point they separate, the cord $c$ going through a curved upwardly extended guide tube 57, and the thread $b$ going around a tension device 60, and thence to the regular stitch forming mechanism provided for in this type of machine. Extending from the guide tube 57 is a lip 58, which receives the cord $c$, and from said lip the cord extends to and enters a throat plate button 70, where it is in position to be sewed into a buttonhole.

In connection with my improvement I provide a lower thread slacker, best shown in Figs. 6 and 7. On the revolving part of the mechanism is fastened a bearing 203, in which is loosely mounted a rod $63^x$ having its ends 63 and 64 bent as shown to provide an actuating portion, and a thread engaging portion. The actuating end 63 is located to be engaged by a trip $64^1$, on the base plate 204, while the thread engaging portion is positioned to engage the lower thread $b$ (Fig. 7), between a guideway 66 and take-up 65, thereby pulling up enough slack after a trimming operation to permit the holding of the thread for the next buttonhole operation. This operation takes place just before the parts reach their normal positions after stitching a buttonhole.

Figs. 1, 2, 3, 4, and 5, show an upper or needle thread slacking mechanism. In adapting my trimmer to a buttonhole machine of the type shown, I have found that I can utilize the motion of the traveling arm on the stationary base to operate the upper thread slacking mechanism. On the side of the traveling arm I provide bearings 205, in which loosely swings a shaft 11, the lower end of which is formed into a crank 13, provided with a vertical latch recess 14. On the upper end of the shaft 11 is adjustably mounted a thread pulling arm 10, and rigidly mounted on the machine arm 206 is a U-shaped thread guide 9, arranged in cooperative position with the thread pulling arm 10. Pivoted on the base 204, by means of screw 207, is a trip 15, provided at one end with a catch 18 and at the opposite end with an extension 17.

A spring 19 is connected to the trip and normally draws the catch 18 toward the latch recess 14 and an adjustable tripper 16, on the moving part 2 of the machine is positioned to engage the extension 17. Just after the stitching operation is completed, the catch 18 engages the latch recess 14, which operates to pull off the needle thread for the next operation. The movement of the arm following engagement of the catch 18 with the latch recess 14 causes a partial turning movement of the arm to move the thread pulling arm 10 in a direction to pull off the needle thread. Further movement of the traveling arm causes the tripper 16 to strike the extension 17, and disengage the catch from the latch recess, and the spring 12 returns the thread pulling arm 10 toward its normal position, which normal position is shown in full lines in Fig. 5. A cam plate 14' is fastened on the stationary part 204 of the machine, and is adjustable through a screw and slot connection. In the backward movement of the traveling arm, the crank end 13 rides off the end of such plate 14', thus freeing upper thread slacker arm 10, and permitting the same to be pulled against the thread guide 9. This provides for yielding all the thread slack, so that the same may be taken up by the first stitch of the sewing mechanism.

Simple means are provided for severing the threads after the buttonhole is completed. It is of course to be understood that in this type of buttonhole machine, the cloth clamps are automatically elevated after completing the buttonhole to relieve the cloth, and that the clamps are lowered by power, and not by a spring, as in other types of machines.

After the clamps are automatically released the arm and mechanism are brought to the positions shown in full lines in Fig. 4. Fig. 12 illustrates an enlarged plan view of the parts shown in full lines in Fig. 4, this being the normal or inoperative position of the mechanism. When in this position, the buttonholed cloth is drawn toward the operator, the buttonhole being located directly above the buttonhole throat plate 70. When in this position, the locking tongue 89 will have been pushed from its locking position with a plate 90, fastened to a bell-crank lever 84, pivoted at 85. The bell-crank lever 84 is operated by any manual means such as at 88. When the lever is operated a pin 82, on its upper end contacts with an extension of a shearing plate 79, which is pivotally mounted on stud screw 85¹. When the shearing plate is operated by the lever 84, it sweeps across a lower shear 78, thereby trimming both threads, loop, and cord. I provide an adjustable trimmer stop 95, and after pressure is released, spring 90¹ returns the trimmer to normal position, and with the same movement I withdraw the cut-off loop which is part of the upper thread, by means of an extension on plate 80, on which is fastened a loop withdrawing hook 93.

The mechanism is so arranged that the trimming mechanism cannot be operated until the sewing machine is automatically stopped, and the locking tongue 89 is disengaged from the plate 90. This action is accomplished by means of an adjustable release mechanism, shown in Figs. 1 and 4. When the stitching mechanism moves from the position shown in dotted lines to the position shown in full lines in Fig. 4, an adjustable lug 92 carried by the traveling arm contacts with a projection 91, which is riveted to and extends from the lock plate 89 and disengages the latter from the plate 90, thereby permitting of the operation of the bell-crank lever 84. As soon as the mechanism is started to make a buttonhole the stitching mechanism is moved backward, and the locking mechanism assumes its normal position and prevents further movement of the trimmer, until the buttonhole is completed.

The mechanism is shown in normal position in Figs. 1, 2, 3, and 4. After placing the cloth $d$ in position, as shown in Fig. 3, the starting chain 24 is actuated, the lever 23 is rocked and clamps 34 are automatically lowered onto the cloth, and as the clamps in this type of buttonhole machine are stationary, the cloth is held in fixed position with the clamps, while the buttonhole is formed. The punch 39 which is here in proper position over the cloth is now operated to form the hole in the cloth, and the travelling arm then moves backward, and subsequently laterally to the end of the hole to form the stitches around the latter, as will be explained. As soon as the parts reach the backward and lateral position, the stitching mechanism is automatically tripped to start the stitching of the buttonhole.

At the time the punch 39 cuts the hole in the cloth, the buttonhole throat plate 70 is in the position shown in Fig. 12. At this time it is to be noted that there are two threads in position, one the cord $c$ and the other the lower needle thread $b$, both protruding through an opening $z$. As soon as the punching operation is completed, and while the sewing mechanism is travelling backward and laterally, the buttonhole throat plate 70 slightly turns as it travels rearwardly and under a lower thread clamping plate 76. In its travel under the plate 76, the lower needle thread $b$ is caught between said plate 76 and a flange 77$^x$, which is above the top level of the surface of the buttonhole throat plate 70, as shown in Fig. 13, the movement of the buttonhole throat plate being in direction of the arrow shown in said figure. The sewing mechanism continues moving backward and laterally, until it and the buttonhole throat plate reaches the position shown in Fig. 14. When the parts reach the position shown in Fig. 14, the stitching mechanism is tripped into action, then the travel of the throat plate 70 is reversed, and the stitching mechanism travels around the hole in the cloth, as shown by the arrows.

71 indicates a pin projecting from the throat plate 70. In Fig. 13, it will be noted that the thread $b$ is just touching the pin 71, and due to the partial rotation of the throat plate in its subsequent movement, the thread $b$ is partly wound around the pin, and is pulled in position as shown in Fig. 14, so that when the stitching occurs the thread which is being held between the throat plate and the thread holding plate 76, will be worked in between the overstitching shown in Fig. 18. The flange of the buttonhole throat plate is provided with corrugations 72, which have caught the end and are advancing the end of the thread $b$ and carrying said end in advance of the stitching, so as to be sure to work it under the overstitching of the buttonhole, and when the space $z^1$ between the two clamps is reached, the end of the thread will be entirely released, so that it will be entirely worked under the cross stitches. This avoids the necessity of trimming the first end. The corrugations in the said throat plate are an absolute necessity to accomplish this result. Another function of the said pin 71 is to prevent the thread $b$ from wiping the end of the cord $c$ from the position it should take. The cord is shown protected by the pin 71 from the cord $b$ in Fig. 13 during its transit to position shown in Fig. 14. If the cord should not have this protection it would wipe backward and would not sew in as it should to make a complete lap. In the travel rearwardly the rest of the slack of the upper needle thread is released in the following manner: As shown in Figs. 1, 3, 4, and 5, there is a small adjustable cam plate 14$^1$ fastened on the stationary part 204 of the machine, and in the backward movement of the travelling arm, the crank 13 drops away from the edge of the said plate, as shown in Fig. 5, which allows the upper thread slacker arm 10 to be pulled against the U-shaped thread guide 9, yielding all the slack to the action of the first stitch made by the sewing mechanism, which latter is automatically tripped into action, thereby allowing a complete loop to be formed in the cloth. If this was not allowed for, the first stitch could not be made in the cloth, and the thread end would be pulled from the eye of the needle; but by employing this means plenty of thread is provided, and it also prevents the clamping of the thread end when placing another piece of cloth under the clamp, the approximate length of the end of the thread extending through the needle being shown in Fig. 4. From the above, it will be apparent that in the initial movement, only a portion of the slack of the upper needle thread is yielded to the needle, so that, as shown in Fig. 4, the end of the thread projected below the needle is too short to reach the fabric and hence cannot be drawn into position to be engaged by the clamp when placing another piece of fabric in position. The remaining slack of the needle thread is, however, yielded to the needle by the operation desired, before the first stitch is taken, so that plenty of thread is thereby provided to permit the formation of the next loop in the fabric. If the thread were of such length as to be clamped onto the fabric by the clamp and thus draw on the slack needle thread from the needle prior to the first stitching operation, a projecting end of thread would be presented at the initial stitching point which would have to be subsequently severed by hand. The friction of the end of the thread against the cloth in perforating it in the act of making the first stitch is sufficient to draw all the thread that the automatic thread slacker has yielded, thus avoiding the necessity of holding the end of the thread in the needle. It must also be understood that without the lower thread slacking means it would be impossible to provide means that would positively hold a thread sufficiently tight to start the first stitches properly in the buttonhole. To meet this contingency, I have provided means for the lower cooperating mechanism to draw off sufficient thread which can be grasped and held for the next buttonhole, as shown and explained.

After the finishing of the stitching of the buttonhole, the machine automatically trips a part of the regular mechanism, which carries the sewing mechanism laterally and forwardly into its normal position, as shown in full lines in Fig. 4, but just before reaching this position, it automatically unclamps the cloth, allowing the cloth to be pulled forward by the movement of the mechanism, by means of the threads and cord of the sewing mechanism. This is permitted by the space $z^1$ between clamping plates 29, 29, and clamps 33, 33; the lower thread going through the spaced gap $z^1$ and assuming a position between the two shear blades 78, 79, as shown in Fig. 12. This positions the threads still fastened to the cloth, allowing it to be trimmed by the manual means, which as previously explained is automatically unlocked. Fig. 16 shows a cross section of the cloth, the threads and cord being attached thereto, and the trimming mechanism ready for trimming. Fig. 15 shows the same positions of the mechanisms after the trimming of the thread and the cloth is removed.

In the forward travel to normal inoperative position, the lower thread slacking means operates as follows: While the thread and cord are still held by its stitches in the cloth, and the same is drawn forward to the position explained above, the lower mechanism revolves in its bearings 200 and 201, to reposition itself for the next buttonhole operation. In the revolving and traveling of the mechanism from rear to forward part of the base 204, the projection of the puller rod 63, Figs. 6, 7, strikes the cam piece 64, which is fastened on the stationary base 204, thereby raising the end 64 against the thread $b$, pulling off sufficient thread from the thread supply for the start of the next buttonhole. After tripping the lower mechanism revolves still further, so as to release the strain on the thread of the puller rod, and thereby on the rod so that when severing of the thread occurs in the act of trimming, it will not snap the thread from its place in the throat plate and lower stitch mechanism.

In the forward travel of the mechanism, the upper thread slacker actuates in the following manner: The upper thread $a$ being held by its stitching in the cloth in its travel to trimming position before mentioned, the shaft 11 being carried forward by the moving sewing mechanism, the latch recess 14 in the end of the bent portion of said shaft, comes in contact with the latch 18, which holds it from traveling forward a predetermined time, thus causing shaft 11 to partially rotate in its bearings 205, pulling off from the supply a certain amount of thread sufficient for the starting of the next buttonhole.

As the thread must be released before it is severed by the trimmer, to avoid the snapping of the thread from the eye of the needle, I provide mechanism to accomplish this function. The trip 15 is pivoted on the base 204, so that it travels with the forward motion. An adjustable tripping device 16 is provided to trip the catch 18 from its hold on the latch 14 of shaft 11, allowing a spring 12 to return the thread pulling arm 10 toward the guide 9, which releases the strain on the thread and allowing the crank 13 to strike the cam plate $14^1$, which is also fastened on the stationary part of the base. This cam plate $14^1$ prevents all the slack pulled off by trip 15 and its cooperating parts, to be surrendered to the needle when the movable parts are in the inoperative positions, for the following reasons:

If the pulled thread was all surrendered in this position, the insertion of the cloth between the clamps would drag the surplus end of the thread under the clamps and would hold it, leaving a long end exposed which would have to be trimmed off by hand afterwards; but I avoid this and leave only a small end protruded, as shown in Fig. 4, which positively cannot reach the clamps when the cloth is clamped, allowing the needle thread to be worked in clean. In the traveling backwards to the stitching position I allow the remainder of the thread to be given to the stitching mechanism by the projection 14, to drop away from the cam piece $14^1$, shown in Fig. 5, which is in position to allow stitching of buttonholes.

It will be apparent from Fig. 3 of the drawings that the movable shear blade or plate 79 engages the threads and cord and moves the latter into contact with the lower shear 78, where the shearing occurs. Therefore, this movement of the movable plate 79 acts to draw upon the threads and cord until contact is had with the lower shear 78. The length of thread and cord projecting above the throat plate, will thus depend upon the position of the lower shear 78 relative to the throat plate, as the farther to the left, as illustrated in Fig. 3, this lower shear is set, the greater will be the length of thread and cord projecting above the throat plate after the shearing operation. It is of course to be understood that this lower fixed shear 78 may be set as desired in the completed machine to provide the desired length of thread and cord.

What I claim is:

1. In a traveling arm buttonhole machine, a stationary clamp, a bodily movable cutting and stitching mechanism, a stationary trimming mechanism, means for pulling surplus thread in the forward travel of the stitching mechanism after completing a buttonhole, and releasing strain on the thread before such forward travel ceases.

2. In a traveling arm buttonhole machine, a stationary clamp, a bodily movable cutting and stitching mechanism, a respectively stationary trimming mechanism, means on the lower part of the stitching mechanism for drawing off sufficient thread for the next buttonhole to be stitched as the stitching mechanism moves from stitching position, means for releasing the strain on the thread before the movable part reaches its stopping position in such movement.

3. In a traveling arm buttonhole machine, a stationary clamp, a bodily movable cutting and stitching mechanism, means on the lower part of the stitching mechanism for drawing of sufficient thread for the next buttonhole to be stitched during movement of the stitching mechanism from operative position, means for releasing the strain on the thread before the movable part reaches its inoperative position, and means for trimming said thread.

4. In a traveling arm buttonhole machine, a stationary clamp, a bodily movable cutting and stitching mechanism, a respectively stationary trimming mechanism, a stationary lower thread holding plate, a revolving throat plate adapted to be rearwardly moved under the thread holding plate, a flange on the throat plate to engage the thread end and hold the same frictionally against the thread holding plate.

5. In a traveling arm buttonhole machine, a stationary clamp, a bodily movable cutting and stitching mechanism, a stationary trimming mechanism, a stationary lower thread holding plate, a revolving throat plate adapted to be rearwardly moved under the thread holding plate, means on the throat plate to allow the grasping of the thread between it and the thread holding plate.

6. In a traveling arm buttonhole machine, a stationary clamp, a bodily movable cutting and stitching mechanism, a stationary trimming mechanism, a stationary lower thread holding plate, a revolving throat plate adapted to be rearwardly moved under the thread holding plate, means on the throat plate to allow the grasping of the thread between it and the thread holding plate while the stitching begins, means on the outer edge of the throat plate for carrying the thread in advance of the stitching for the purpose set forth.

7. In a traveling arm buttonhole machine, a stationary clamp, a bodily movable cutting and stitching mechanism, a stationary trimming mechanism, a stationary lower thread holding plate, a revolving throat plate adapted to be rearwardly moved under the thread holding plate, means on the throat plate to allow the grasping of the thread between itself and the stationary holding plate, and another means on the throat plate for positioning the lower stitching thread to place it at a proper starting position.

8. In a traveling arm buttonhole machine, a stationary clamp, a bodily movable cutting and stitching mechanism, a stationary lower thread holding means, a revolving throat plate adapted to be rearwardly moved under the thread holding cooperating means, means on the throat plate to allow the grasping of the lower thread between itself and the cooperating means, and another means on the throat plate for positioning the lower stitching thread for stitching, means for advancing the held ends in advance of the stitching, the lower thread holding cooperating means being formed to allow the ends to be released from the holding means for the purpose set forth, and means for trimming thread after completing the buttonhole.

9. In a traveling arm buttonhole machine, a stationary clamp, a bodily movable cutting and stitching mechanism, a stationary trimming mechanism, a stationary lower thread holding means, a revolving throat plate adapted to be rearwardly moved under the thread holding cooperating means to allow the grasping of the lower thread between itself and the cooperating means, and means on the throat plate for positioning the lower thread for stitching, said holding means being interrupted to free the lower stitching thread, the stitching thread positioning means also guarding the end of a reinforcing cord, the stitching operation covering the reinforcing cord and lower thread end.

10. In a traveling arm buttonhole machine, a stationary clamp, a bodily movable cutting and stitching mechanism, a relatively stationary trimming mechanism, means for locking the trimmer while the mechanism for stitching is in operation, and means carried by the movable cutting and stitching mechanism for unlocking the trimming mechanism when the stitching mechanism is forward.

11. In a traveling arm buttonhole machine, bodily movable upper and lower stitching mechanism, means for pulling surplus thread in both the upper and lower stitching mechanism, means for releasing the thread pulling means from their thread pulling positions to relieve the strain upon the thread trimming means for severing the threads from the buttonhole fabric after the pulling mechanisms have operated on the threads.

12. In a buttonhole machine, bodily movable stitching mechanism including a needle and means to supply a lower thread, means for pulling surplus thread from the needle, other means for pulling the lower thread to supply a surplus thread for starting the next buttonhole, means for simultaneously trimming the upper thread and lower thread by completely severing the loop of the upper thread and cutting the lower thread, the operation of pulling off the surplus thread occurring subsequent to the stitching of the buttonhole and prior to the trimming of the thread.

13. In a buttonhole machine, the combination of stitching mechanism including a reciprocating needle bar, a vibrating hook, a lower needle, means for actuating the upper and lower needle and the looper hook, the needle thread at the time of stopping the stitching mechanism being fastened in the fabric and around the looper hook, trimming means, and means on the trimmer for extracting the loop after same is severed from the fabric.

14. In a buttonhole machine, the combination of stitching mechanism including a traveling arm, and means for pulling surplus thread during a portion of the forward travel of said arm, said surplus thread being greater than the normal thread length required for such arm travel.

15. In a buttonhole machine, the combination of bodily movable stitching mechanism including an arm, means for pulling surplus thread during a portion of the travel of said arm in one direction, the pull of said means on the thread being released to relieve the strain on the thread prior to the arm reaching the limit of travel in said direction.

16. In a buttonhole machine, the combination of stitch forming mechanism, work holding means, means for creating relative movement between the stitch forming mechanism and the work holding means, means for pulling surplus thread for a portion of the movement between the stitch forming mechanism and the work holding means, the pull of said means on the thread being released to relieve the strain on the thread prior to the time the limit of movement between the work holding means and the stitch forming mechanism is reached.

17. In a buttonhole machine, the combination of stitch forming mechanism, work holding means, means for creating relative movement between the stitch forming mechanism and the work holding means, means for pulling surplus thread during the movement created between the stitch forming mechanism and the work holding means, the pull of said means on the thread being released to relieve the strain on the thread prior to the time the limit of movement between the work holding means and the stitch forming mechanism is reached.

18. In a buttonhole machine, the combination of stitch forming mechanism, a work clamp, means for creating relative movement between the work clamp and the stitch forming mechanism, means for removing the work after the stitching operation is completed and simultaneously drawing off surplus thread and subsequently relieving the strain thereon before the movement of the work ceases, to produce a limited slack in the thread.

19. In a buttonhole machine, the combination of stitch forming mechanism, work holding means, means for creating relative movement between the stitch forming mechanism and the work holding means, means for pulling surplus thread during the movement created between the stitch forming mechanism and the work holding means, the pull of said means on the thread being released to relieve the strain on the thread prior to the time the limit of movement between the work holding means and the stitch forming mechanism is reached, and means for subsequently relieving all strain of the thread pulling means.

20. In a buttonhole machine, the combination of upper and lower stitch forming mechanisms, a work clamp, means for creating relative movement between the work clamp and the upper and lower stitch forming mechanisms, means for pulling surplus thread in both the upper and lower stitch forming mechanisms, means for releasing the thread pulling means from their thread pulling positions to relieve the strain upon the threads, trimming means for severing the threads from the buttonhole cloth after the relief of strain on the threads.

21. In a buttonhole machine, the combination of stitch forming mechanism which in operation forms a loop from the upper thread between the cloth and the lower stitch forming mechanism, trimming means for severing the lower thread and the loop, and means for extracting the loop after same is severed from the cloth.

22. In a buttonhole machine, the combination of stitch forming mechanism, a work clamp, means for creating relative movement between the work clamp and the stitch forming mechanism, means for pulling surplus thread during a portion of the created movement between the work clamp and the stitch forming mechanism, said surplus thread being greater than the normal thread length required for such movement.

23. In a buttonhole machine, the combination of stitch forming mechanism, trimming mechanism, means for pulling off sufficient thread to start the next succeeding buttonhole stitches, means to prevent surrendering of the entire amount of thread pulled off when the mechanism is in stopped position, means for starting the stitching mechanism, and means for surrendering the remainder of the pulled off thread before the stitching operation begins.

24. A buttonhole machine, the combination of upper and lower stitch forming mechanisms, means associated therewith for laying in a cord under the stitches, the stitching mechanisms in operation forming a loop between the work and the lower stitch forming mechanism when the machine stops, a trimmer, and means to present the thread loops and cord to the trimmer to be severed in one operation.

25. In a buttonhole machine, the combination of stitch forming mechanism, means for bodily moving the stitch forming mechanism while inoperative in a substantially straight path and subsequently moving same while operative in a path corresponding to the out-line of a buttonhole, means for drawing off surplus thread when completing a previous stitching operation and surrendering but a part of it while the stitch forming mechanism is inoperative and subsequently surrendering the remainder of the drawn off thread in the next succeeding stitching operation, whereby the ends of the threads are worked in the stitches, a trimmer, and means for presenting the threads to the trimmer after the stitching operation is completed, the surplus thread being drawn off at the time the threads are being moved to the trimmer.

26. In a buttonhole machine, work holding means, stitching mechanism, including means to supply a lower thread, means for creating relative movement between the work holding means and stitching mechanism, and a further relative movement following the stitching operation, and pulling off mechanism operated during a portion of such further relative movement for pulling a surplus length of lower thread from the supply.

27. In a buttonhole machine, work holding means, stitching mechanism, including means to supply a lower thread, means for creating relative movement between the work holding means and stitching mechanism, and a further relative movement following the stitching operation, and means operated during a portion of such further relative movement for pulling a surplus length of lower thread from the supply, said thread pulling means releasing the pulling tension on the thread prior to the completion of the particular relative movement between the work holding means and stitching mechanism.

28. In a buttonhole machine, work holding means, stitching mechanism, means for producing a relative movement between the stitching mechanism and the work holding means, and a further relative movement following the stitching operation, thread trimming means, and means to produce a slack condition of thread during such further relative movement said trimming means being inoperable prior to the slack thread condition.

29. In a buttonhole machine, the combination of a stitch forming mechanism, work holding means, means for creating relative movement between the stitch forming mechanism and the work holding means, means for moving the work after the stitching operation is completed, and pulling off mechanism operative during said work movement to draw off surplus thread to an extent in excess of that required for such work movement.

30. In a buttonhole machine, the combination of stitch forming mechanism, work holding means, means for creating relative movement between the stitch forming mechanism and work holding means, means for moving the work from a stitching position to a trimming position, and means operated during movement of the work from a stitching position to a trimming position to produce a slack condition of the thread when the work reaches a trimming position.

31. In a buttonhole machine, the combination of stitching mechanism, work holding means, means for creating a relative movement between the stitching mechanism and work holding means, means for trimming the threads, and means to lay in the initial excess length of trimmed lower thread in the succeeding stitching operation.

32. In a buttonhole sewing machine, stitching mechanism including an under thread mechanism, work holding means, means for producing a relative movement between the stitching mechanism and the work holding means, means for producing a slack in the under thread, means for trimming the under thread and means operative to lay in the excess end of under thread produced by said slack at the subsequent stitching operation.

33. In a buttonhole sewing machine, stitching mechanism including an under thread mechanism, work holding means, means for producing a relative movement between the stitching mechanism and the work holding means, means for producing a slack in the under thread, means for trimming the under thread, and means operative to lay in the excess end of under thread produced by said slack at the subsequent stitching operation, said laying in means being operative in the relative movement of the stitching mechanism and the work holding means.

34. In a buttonhole machine, comprising stitch forming mechanism, including an upper thread mechanism, work holding means, means for producing a relative movement between the stitch forming mechanism and work holding means, means for drawing off an excess length of such upper thread during said relative movement following a stitching operation, and means for surrendering successive lengths of such pulled off portion of the upper thread at progressive stages of such relative movement between the stitching mechanism and work holding means toward stitching position.

35. In a buttonhole machine, stitch forming mechanism including an upper thread mechanism, work holding means, means for producing a relative movement between said stitching mechanism and work holding means to move the work from the stitching position to a trimming position and return it to the stitching position, means for trimming the thread when the work is in the trimming position, means for pulling off a surplus length of upper thread in the relative movement between the stitching mechanism and work holding means from stitching to trimming position, means for releasing said pulling off means to an extent to produce a slack in said thread in a trimming position, and means to release said pulling off means to surrender the remaining length of pulled off thread immediately prior to the parts reaching their stitching position.

36. In a buttonhole machine, work holding means and stitching mechanism adapted for relative movement to and from a stitching position and trimming position, means for producing a determinate excess length of thread during the movement from the stitching position to the trimming position, and means for releasing a portion of such excess length of thread immediately prior to the parts reaching the trimming position, whereby the thread when trimmed is free of tension.

37. In a buttonhole stitching mechanism, including an upper thread mechanism, work holding means, a trimmer, means for creating a relative movement between the work holding means and stitching mechanism to move the parts to and from a stitching position and trimming position, means operative during a movement of the parts from the stitching position to trimming position to pull off an excess length of upper thread, and means to surrender a portion of such pulled off upper thread immediately prior to the parts reaching the trimming position, the surrendered portion of upper thread being of a length to avoid being caught by the work holding means in the application of the work thereto following a stitching position of the parts.

38. In a buttonhole stitching mechanism, including an upper thread mechanism, work holding means, a trimmer, means for creating a relative movement between the work holding means and stitching mechanism to move the parts to and from a stitching position and trimming position, means operative during a movement of the parts from the stitching position to trimming position to pull off an excess length of upper thread, and means to surrender a portion of such pulled off upper thread immediately prior to the parts reaching the trimming position, the surrendered portion of upper thread being of a length to avoid being caught by the work holding means in the application of the work thereto following a stitching position of the parts, whereby to avoid a projecting length of thread from the initial stitching movement, the remaining length of thread pulled off being surrendered immediately preceding the stitching operation and following the return of the parts to a stitching position.

39. In a buttonhole machine, comprising stitching mechanism including an under thread mechanism, work holding means, means for producing a relative movement between the work holding means and stitching mechanism, and a further relative movement following the stitching operation, trimming means, and means for producing an excess length of under thread during such further relative movement, and prior to the parts reaching the position to permit operation of the trimming means.

40. In a sewing machine, the combination with a frame of work clamping means, stitch forming mechanism comprising upper thread handling mechanism and lower thread handling mechanism, means for creating a relative movement between the work holding means and the stitching mechanism following the stitching operation, and means operative during such relative movement to act on the lower thread beneath the work and draw out from the source of supply a sufficient length to insure the proper formation of the initial stitch of the next successive stitching operation, and then to cut the under thread close to the work.

41. In a sewing machine, the combination with work holding means, of stitch forming mechanism comprising means for manipulating both an upper and a lower thread, means for giving the work holding means and stitch forming mechanism a relative movement during the stitching operation, and a further relative movement at the end of the stitching operation by which the work and stitch forming mechanism are moved relatively from stitching to cutting position, and a device operated during such further relative movement to act on the lower thread beneath the work without gripping said thread thereby to draw out a sufficient length thereof to insure the proper formation of the first stitch of the next succeeding buttonhole.

42. In a sewing machine, the combination with work holding means of stitch forming mechanism, comprising means for manipulating both an upper and lower thread, means for giving the work holding means and stitch forming mechanism a relative movement during the stitching operation, and a further relative movement at the end of the stitching operation, and means operative during such further relative movement to act on the lower thread beneath the work thereby to draw out a sufficient length thereof to insure a proper formation of the first stitch of the next succeeding buttonhole and then to cut the thread close to the work after said length has been drawn out.

43. In a sewing machine, a combination of work holding means, lower thread handling mechanism, a rotary turret on which said mechanism is sustained, a tension for the lower thread mounted on said turret, means operative at the end of a stitching operation to act on the under thread beneath the work and draw through said tension device a length of thread sufficient to insure the proper formation of the initial stitch of the next succeeding operation.

44. In a buttonhole sewing machine, the combination of stitch forming mechanism including means for manipulating both an upper and a lower thread, work holding means, means to move said work holding means and stitch forming mechanism relative to each other during the stitching operation on a buttonhole and subsequent thereto, and a pulling off member actuated during such subsequent relative movement to pull off a length of lower thread sufficient to insure the proper formation of the initial stitch on the next buttonhole.

45. In a buttonhole sewing machine, the combination of work holding means, of a rotatable turret provided with a throat and having provision for delivering a stay cord from the throat, under thread mechanism carried by the turret, and means operative at the end of the stitching operation to act on the lower thread to draw out from the throat a predetermined length thereof.

46. In a buttonhole sewing machine, the combination with a frame, of work holding means thereon, stitch forming mechanism, means to produce a relative movement between the stitch forming mechanism and work holding means during the stitching on a buttonhole, and a further relative movement at the completion of the stitching operation, and means operative during such further relative movement to draw out from the source of supply a sufficient length of under thread to insure the proper formation of the initial stitch of the next succeeding stitching operation, and means to cut the under thread close to the work.

47. In a buttonhole machine, stitch forming mechanism, comprising means for manipulating both an upper and a lower thread, said means including a rotary throat plate, and a revoluble guide for a stay cord and lower thread and having means to maintain the cord and thread separated.

48. In a sewing machine, stitch forming mechanism, comprising means for manipulating both an upper and a lower thread, said means including a throat plate, a cloth support, a clamp, a trimming mechanism, said throat plate being freely movable beneath the cloth support while stitching a buttonhole, a trimming mechanism operating on the lower thread above the throat plate to leave a length of thread beyond the throat plate to be stitched into the next succeeding buttonhole.

49. In a sewing machine, stitch forming mechanism, comprising means for manipulating both an upper and a lower thread, said means including a throat plate, a cloth support, a clamp, a trimming mechanism, said throat plate being freely movable beneath the cloth support while stitching a buttonhole, a trimming mechanism operating on the thread above the throat plate to leave a length of thread beyond the throat plate to be stitched into the next succeeding buttonhole, and means on the throat plate to advance the end of the lower thread during the stitching of the next succeeding buttonhole to a position to cause said lower thread end to be stitched in during the formation of said buttonhole stitches.

50. In a buttonhole machine, clamping means, upper thread mechanism, lower thread mechanism, the lower thread mechanism having a hook and including a throat plate, said upper thread mechanism and lower thread mechanism being mounted for relative movement to the clamping mechanism for stitching the buttonhole, said throat plate receiving a stay cord, said hook compelling a loop formation of the upper thread below the cloth, thread slackening means for both the upper and lower threads operable following the buttonhole stitching operation, and means for simultaneously trimming the loop of the upper thread, the lower thread, and stay cord.

51. In a buttonhole machine, clamping means, upper thread mechanism, lower thread mechanism, the lower thread mechanism having a hook and including a throat plate, said upper thread mechanism and lower thread mechanism being mounted for relative movement to the clamping mechanism for stitching the buttonhole, said throat plate receiving a stay cord, said hook compelling a loop formation of the upper thread below the cloth, thread slackening means for both the upper and lower threads operable following the buttonhole stitching operation, and means for simultaneously trimming the loop of the upper thread, the lower thread, and stay cord, and means for temporarily holding the free end of the lower thread during the initial stitches of the next succeeding buttonhole.

52. In a buttonhole machine, clamping means, upper thread mechanism, lower thread mechanism, the lower thread mechanism having a hook and including a throat plate, said upper thread mechanism and lower thread mechanism being mounted for relative movement to the clamping mechanism for stitching the buttonhole, said throat plate receiving a stay cord, said hook compelling a loop formation of the upper thread below the cloth, thread slackening means for both the upper and lower threads operable following the buttonhole stitching operation, and means for simultaneously trimming the loop of the upper thread, the lower thread, and stay cord, and means for temporarily holding the free end of the lower thread during the initial stitches of the next succeeding buttonhole, and means for subsequently advancing the free end of the lower thread to be sewn in by succeeding stitches of said next succeeding buttonhole.

53. In a buttonhole sewing mechanism, revoluble upper thread mechanism, revoluble lower thread mechanism, the latter including a throat plate, a cloth support arranged above the throat plate, a clamp cooperating with the cloth support, a lower thread slackening means to produce a slack in the lower thread between the top of the throat plate and the lower part of the cloth support, and trimming means to cut the slack thread immediately adjacent the fabric.

54. In a buttonhole sewing mechanism, revoluble upper thread mechanism, revoluble lower thread mechanism, the latter including a throat plate, a cloth support arranged above the throat plate, a clamp cooperating with the cloth support, a lower thread slackening means to produce a slack in the lower thread between the top of the throat plate and the lower part of the cloth support, and trimming means to cut the slack thread immediately adjacent the fabric, and means for causing the free end of the lower thread to be guided to and temporarily held between the cloth support and revoluble throat plate.

55. In a buttonhole sewing mechanism, revoluble upper thread mechanism, revoluble lower thread mechanism, the latter including a throat plate, a cloth support arranged above the throat plate, a clamp cooperating with the cloth support, a lower thread slackening means to produce a slack in the lower thread between the top of the throat plate and the lower part of the cloth support, and trimming means to cut the slack thread immediately adjacent the fabric, and means for causing the free end of the lower thread to be guided to and temporarily held between the cloth support and revoluble throat plate, and means for advancing the temporarily held end during the stitching operation of the next succeeding buttonhole.

56. In a buttonhole sewing mechanism, revoluble upper thread mechanism, revoluble lower thread mechanism, the latter including a throat plate, a cloth support arranged above the throat plate, a clamp cooperating with the cloth support, a lower thread slackening means to produce a slack in the lower thread between the top of the throat plate and the lower part of the cloth support, and trimming means to cut the slack thread immediately adjacent the fabric, a stay cord guiding means carried by the throat plate, said throat plate positioning the stay cord to be cut by the said trimming means simultaneously with the cutting of the lower thread.

57. In a buttonhole machine, a clamping means, upper thread mechanism, lower thread mechanism, the lower thread mechanism having a hook and including a throat plate, said upper thread mechanism and lower thread mechanism being mounted for relative movement to the clamping mechanism for stitching the buttonhole, said hook compelling a loop formation of the upper thread below the cloth, thread slackening means for both the upper and lower threads operable following the buttonhole stitching operation, and means for simultaneously trimming the loop of the upper thread and the lower thread.

58. In a revoluble sewing mechanism for buttonhole machines, a thread trimming device, mechanism comprising upper and lower thread handling mechanism, a clamp, a cloth plate, a friction plate attached below the cloth plate, said clamp and cloth plates being formed with openings to allow free passage of the threads therethrough, the edge of the friction plate cooperating with the edge of the cloth plate, a throat plate of a diameter exceeding the opening in the clamp and cloth plate, the outer edge of the throat plate coacting with the side of the friction plate to hold the end of the lower thread when the throat plate and parts are in position to place the initial stitch.

59. In a revoluble sewing mechanism for buttonhole machines, thread trimming means, upper and lower thread handling mechanism, a clamp, a cloth plate, an elastic friction plate attached below the cloth plate, the clamp plate and cloth plate being formed with an opening to allow free action of the threads therethrough, the friction plate registering with the edge of the cloth plate, a throat plate having an edge to coact with the side of the friction plate adjacent the opening in the cloth plate, to thereby hold the end of the lower thread when the throat plate and coacting parts are in stitching position to place the initial stitch.

60. In a buttonhole sewing machine, work holding means, sewing mechanism comprising upper and lower stitching means, means for producing a relative movement between the work holding means and sewing mechanism following the stitching operation to move the work to a trimming position, thread trimming means, locking means for preventing operation of the trimming means while the parts are in stitching position, and means for releasing the locking means following the completion of the stitching operation.

61. In a sewing machine, clamping means, upper thread mechanism, lower thread mechanism, the lower thread mechanism including a throat plate, said upper thread mechanism and lower thread mechanism being mounted for relative movement to the clamping mechanism for stitching the buttonhole, said throat plate receiving a stay cord, means for trimming the upper thread, lower thread, and stay cord, and means to pull out an additional length of lower thread prior to the stitching of the next succeeding buttonhole.

62. In a sewing machine, clamping means, upper thread mechanism, lower thread mechanism, the lower thread mechanism including a throat plate, said upper thread mechanism and lower thread mechanism being mounted for relative movement to the clamping mechanism for stitching the buttonhole, said throat plate receiving a stay cord, means for trimming the upper thread, lower thread, and stay cord, and means to pull out an additional length of the lower thread beyond the throat plate after trimming.

63. In a buttonhole stitching mechanism, a turret with supports, upper and lower stitching mechanism, a throat plate supported by the lower stitching mechanism and formed with an opening through which the upper and lower needle mechanism coact, a stay cord guide mounted to direct a stay cord through said opening, thread trimming means having one element relatively fixed and a movable coacting element, and means to prevent movement of said coacting element until after the stitching machine is at rest and the mechanism is moving from a stitching position to a trimming position.

64. In a buttonhole machine, including a revoluble turret sewing mechanism, thread trimming mechanism so positioned and operated that the end of loose thread is a predetermined length above the throat plate after trimming, and means for holding the lower thread while the initial stitches are being placed in the stitching operation, the said holding means serving to advance the end of the thread ahead of the stitching operation to cause the said end to be stitched under the over stitches of the completed buttonhole.

65. A buttonhole machine including a revoluble turret sewing mechanism having a throat plate, a stay cord guide to direct a stay cord to the throat plate, trimming mechanism for the thread and cord positioned and operated so that the severed ends are a predetermined length above the throat plate, means for holding the lower thread end while the initial stitches are being placed, the said holding means advancing the end of the thread ahead of the stitching operation to cause the said end to be stitched under the over stitches, and means to guard and direct the trimmed stay cord end in a direction in advance of the buttonhole over stitches.

66. A buttonhole machine comprising a revoluble turret sewing mechanism including a throat plate, a stay cord guide in the throat plate, thread trimming mechanism positioned and operated so that the ends are a predetermined length above the throat plate, means for holding the lower thread while the initial stitches are being placed, the said holding means advancing the end of the thread in advance of the stitching operation to cause the said end to be stitched under the over stitches, means to guard and direct the trimmed cord end in a direction in advance of the buttonhole over stitches, a separate cord guide spaced from the cord guide in the throat plate, and means in the separate guide to prevent withdrawal of the trimmed cord lengths after trimming.

67. In a buttonhole machine, upper and lower thread stitching mechanism, means for guiding a stay cord, means whereby the work may be moved from a stitching position to a trimming position, and a trimming mechanism locked against operation while the work is in stitching position, said trimming mechanism comprising a relatively fixed shear and a relatively movable cooperating shear to engage the threads and stay cord and move them into cooperation with the fixed shear to sever the same, the relative distance of the fixed shear from the direct line of the threads and cord when the parts are in trimming position determining the length of the free trimmed ends of such threads and cord.

68. In a buttonhole machine, sewing mechanism including an under thread mechanism, a rotary turret having a throat plate, trimming means for trimming the under thread, and means with which the throat plate coacts to hold the trimmed end of the under thread.

69. In a buttonhole machine, sewing mechanism including an under thread mechanism, a rotary turret having a throat plate, trimming mechanism for trimming the under thread, and means with which the throat plate coacts to hold and advance the trimmed end of the under thread to cause it to be arranged under the over stitches of a succeeding buttonhole.

70. In a buttonhole machine, work holding means, stitch forming mechanism including an upper thread mechanism and a lower thread mechanism, means for creating a relative movement of the parts following a stitching operation to move the work from stitching position to a trimming position, a single manually-operable trimming means operative to sever the upper and lower threads in a single operation after the work has reached a trimming position, and means for locking the trimming means against operation until the parts have reached trimming position.

71. In a buttonhole machine, work holding means, stitching mechanism including an upper thread mechanism and a lower thread mechanism, means to direct a stay cord to be stitched in position around the buttonhole, and means for moving the work to a trimming position following the completion of the stitching operation, a single manually-operable trimming means operative to simultaneously sever the upper thread, the lower thread, and stay cord, after the work has reached the trimming position, and means for locking the trimming means against operation until the parts have reached trimming position.

72. In a buttonhole machine, upper and lower thread stitching mechanism, means whereby the work may be moved from a stitching position to a trimming position, and a trimming mechanism locked against operation while the work is in stitching position, said trimming mechanism comprising a relatively fixed shear and a relatively movable cooperating shear to engage the threads and move them into cooperation with the fixed shear to sever said threads, the length of the free ends of the trimmed threads being gauged by the distance at which the cutting edge of the fixed shear is disposed at one side of the directly pendant line of the threads.

In testimony whereof I have signed my name to this specification in the presence of two subscribing witnesses.

HENRY C. MILLER.

Witnesses:
E. F. JELF,
C. C. ORMSBY.